US009799921B2

(12) United States Patent
Hashimoto et al.

(10) Patent No.: US 9,799,921 B2
(45) Date of Patent: Oct. 24, 2017

(54) METHOD OF MANUFACTURING NEGATIVE ELECTRODE FOR SOLID-STATE BATTERY, METHOD OF MANUFACTURING SOLID-STATE BATTERY, AND NEGATIVE ELECTRODE SLURRY

(71) Applicant: TOYOTA JIDOSHA KABUSHIKI KAISHA, Toyota-shi, Aichi-ken (JP)

(72) Inventors: Yuichi Hashimoto, Numazu (JP); Keisuke Watanabe, Tokyo (JP); Yoshiyuki Nagasawa, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 14/805,997

(22) Filed: Jul. 22, 2015

(65) Prior Publication Data

US 2016/0028108 A1 Jan. 28, 2016

(30) Foreign Application Priority Data

Jul. 23, 2014 (JP) .................................. 2014-149697

(51) Int. Cl.
*H01M 4/04* (2006.01)
*H01M 10/0562* (2010.01)
*H01M 4/62* (2006.01)
*H01M 10/0525* (2010.01)

(52) U.S. Cl.
CPC ..... *H01M 10/0562* (2013.01); *H01M 4/0404* (2013.01); *H01M 4/62* (2013.01); *H01M 4/623* (2013.01); *H01M 10/0525* (2013.01)

(58) Field of Classification Search
CPC ............................ H01M 4/0404; H01M 4/623
See application file for complete search history.

(56) References Cited

U.S. PATENT DOCUMENTS

2013/0142943 A1 6/2013 Kubo et al.
2015/0096169 A1* 4/2015 Hasegawa ........... H01M 4/0404
29/623.5

FOREIGN PATENT DOCUMENTS

JP 08-4007 B * 1/1996
JP 2012-204114 A 10/2012
JP 2013-118143 A * 6/2013
(Continued)

OTHER PUBLICATIONS

Machine Translation Japanese Patent 08-4007, Date Unknown.*
Machine Translation Japanese Patent 2013-118143, Date Unknown.*

*Primary Examiner* — Jeff Aftergut
(74) *Attorney, Agent, or Firm* — Oliff PLC

(57) ABSTRACT

Provided is a method of manufacturing a negative electrode for a solid-state battery, the method including: a step of mixing a negative electrode active material, a sulfide solid electrolyte, a binder, and a solvent with each other to prepare a negative electrode slurry; a step of applying the prepared negative electrode slurry to a surface of a solid electrolyte layer of the solid-state battery or a substrate of the negative electrode; and a step of drying the applied negative electrode slurry. In this method, the solvent is butyl butyrate, and the binder is a copolymer containing a vinylidene fluoride (VDF) monomer unit and a hexafluoropropylene (HFP) monomer unit, in which a molar ratio of the HFP monomer unit to a total amount of the VDF monomer unit and the HFP monomer unit is 10% to 25%.

5 Claims, 7 Drawing Sheets

(56) References Cited

FOREIGN PATENT DOCUMENTS

| JP | 2013-118143 A | 6/2013 |
|----|---------------|--------|
| JP | 2013-211238 A | 10/2013 |
| JP | 2014-078400 A | 5/2014 |

\* cited by examiner

IMMEDIATELY AFTER BINDER ADDITION

LEFT TO STAND FOR 2 HOURS (AFTER SWELLING)

ULTRASONIC TREATMENT 3 MINUTES

LUMPS
(UNDISSOLVED LUMPS)
OF BINDER

METHOD OF MANUFACTURING NEGATIVE ELECTRODE FOR SOLID-STATE BATTERY, METHOD OF MANUFACTURING SOLID-STATE BATTERY, AND NEGATIVE ELECTRODE SLURRY

INCORPORATION BY REFERENCE

The disclosure of Japanese Patent Application No. 2014-149697 filed on Jul. 23, 2014 including the specification, drawings and abstract is incorporated herein by reference in its entirety.

BACKGROUND OF THE INVENTION

1. Field of the Invention

The present invention relates to a method of manufacturing a negative electrode for a solid-state battery, a method of manufacturing a solid-state battery, and a negative electrode slurry.

2. Description of Related Art

As a battery having high safety, a solid-state battery is known. The solid-state battery includes: electrodes that include an active material; and a solid electrolyte layer that is a separator layer interposed between the electrodes. The electrodes or the solid electrolyte layer can be easily manufactured using a slurry in which an active material or a solid electrolyte is dispersed in a solvent. For example, as described in Japanese Patent Application Publication No. 2013-118143 (JP 2013-118143 A), a desired electrode layer can be obtained through the following steps of: mixing an electrode active material, a sulfide solid electrolyte, a binder, and a solvent to prepare a slurry; applying the slurry; and drying the slurry.

In the related art, for example, polyvinylidene fluoride is used as a binder. When polyvinylidene fluoride is used as a binder, for example, N-methylpyrrolidone can be preferably used as a solvent from the viewpoint of the solubility of polyvinylidene fluoride. However, as a result of thorough research, the present inventors found that N-methylpyrrolidone reacts with a sulfide solid electrolyte to decrease the lithium ion conductivity of the electrolyte.

On the other hand, when an ester-based solvent such as butyl butyrate or an ether-based solvent such as dibutyl ether is used as a solvent, there is a problem in the solubility of polyvinylidene fluoride in the solvent. From this point of view, in the related art, a copolymer of vinylidene fluoride with another monomer is used as a binder to adjust the solubility of the binder in a solvent. As the binder, a three-component copolymer of vinylidene fluoride (VDF), hexafluoropropylene (HFP), and tetrafluoroethylene (TFE) is particularly preferable. However, as a result of thorough research, the present inventors found that, when such a three-component binder is used, the battery capacity decreases during initial charging.

In addition, when polyvinylidene fluoride or a three-component copolymer of VDF, HFP, and TFE is used as a binder as in the related art, the adhesive force between a current collector and an electrode layer is not sufficient, and the peeling or cracking of an electrode may occur during the manufacture of a solid-state battery.

As described above, in the related art, when a negative electrode for a solid-state battery is manufactured, the following effects of preventing deterioration of a sulfide solid electrolyte, securing a sufficient adhesive force between a current collector and an electrode layer, and suppressing capacity deterioration caused by a negative electrode, cannot be simultaneously obtained.

SUMMARY OF THE INVENTION

The invention provides a method of manufacturing a negative electrode for a solid-state battery, a method of manufacturing a solid-state battery, and a negative electrode slurry, capable of preventing deterioration of a sulfide solid electrolyte, securing a sufficient adhesive force between a current collector and a negative electrode layer, and suppressing capacity deterioration caused by a negative electrode.

The present inventors thoroughly studied a method of manufacturing a negative electrode for a solid-state battery using a negative electrode slurry. As a result, the following multiple findings were obtained.

(1) In a negative electrode, when a three-component copolymer of vinylidene fluoride (VDF), hexafluoropropylene (HFP), and tetrafluoroethylene (TFE) is used as a binder, the binder is reduced and decomposed at around 3 V during the initial charging of a solid-state battery, and the irreversible capacity increases (that is, the battery capacity decreases) due to the negative electrode. The reason is presumed to be that the TFE portion of the binder reacts with lithium ions during charging. As a result of thorough research to verify this point, it was found that, when a binder excluding TFE is actually used, a decrease in capacity caused by a negative electrode does not occur. That is, in order to suppress a decrease in battery capacity, it is effective to exclude TFE from a binder.

(2) In order to suppress deterioration of a sulfide solid electrolyte, it is effective to use a solvent having low reactivity with a sulfide solid electrolyte as a solvent constituting a slurry. As a result of thorough research, it was found that the use of butyl butyrate, dibutyl ether, or cyclopentyl methyl ether is effective as the solvent.

(3) In order to suppress a decrease in battery capacity, when polyvinylidene fluoride (PVDF) which is a single-component binder is used as a binder excluding TFE in consideration of (1) described above, the binder cannot be made to be dissolved or dispersed well in each of butyl butyrate, dibutyl ether, and cyclopentyl methyl ether of (2) described above, and the adhesion between a negative electrode layer and a current collector cannot be secured.

(4) In order to suppress a decrease in battery capacity, when a two-component binder of VDF and HFP is used as a binder excluding TFE in consideration of (1) described above, the binder cannot be made to be dissolved or dispersed well in dibutyl ether and cyclopentyl methyl ether among the solvents of (2) described above, and the adhesion between a negative electrode layer and a current collector cannot be secured. On the other hand, at a specific copolymerization ratio in the binder, the binder can be highly dispersed in butyl butyrate among the solvents of (2) described above, and a sufficient adhesive force can be secured between a negative electrode layer and a current collector in a negative electrode obtained from the slurry. Specifically, a copolymerization ratio (molar ratio) of HFP in the binder is set to be 10% or higher.

(5) On the other hand, when a copolymerization ratio (molar ratio) of RFP in a two-component binder of VDF and HFP is higher than 20%, flexibility increases along with an increase in the copolymerization ratio of HFP, and the binder becomes flexible. That is, in order to cause a binder to appropriately function, a copolymerization ratio (molar ratio) of HFP in the binder is 25% or lower and preferably 20% or lower.

(6) As described above, during the manufacture of a negative electrode for a solid-state battery, when a two-component binder of VDF and HFP having a predetermined copolymerization ratio is used as a binder, and when butyl butyrate is used as a solvent, deterioration of a sulfide solid electrolyte can be suppressed, a sufficient adhesive force can be secured between a current collector and a negative electrode layer, and capacity deterioration caused by a negative electrode can be suppressed.

The invention has been made based on the above-described findings. That is, according to a first aspect of the invention, there is provided a method of manufacturing a negative electrode for a solid-state battery, the method including: a first step of mixing a negative electrode active material, a sulfide solid electrolyte, a binder, and a solvent with each other to prepare a negative electrode slurry; a second step of applying the prepared negative electrode slurry to a surface of a solid electrolyte layer of the solid-state battery or a substrate of the negative electrode; and a third step of drying the applied negative electrode slurry, in which butyl butyrate is used as the solvent, and a copolymer consisting of a vinylidene fluoride (VDF) monomer unit and a hexafluoropropylene (HFP) monomer unit is used as the binder. A molar ratio of the HFP monomer unit to a total amount of the VDF monomer unit and the HFP monomer unit is 10% to 25%.

In the invention, the meaning of "mixing a negative electrode active material, a sulfide solid electrolyte, a binder, and a solvent with each other to prepare a negative electrode slurry" includes a case where a negative electrode active material, a sulfide solid electrolyte, a binder, a solvent, and optional components other than the negative electrode active material, the sulfide solid electrolyte, the binder, and the solvent are mixed with each other to prepare a negative electrode slurry.

The first step may include a step of adding the binder to the solvent and then leaving the binder to stand in the solvent such that the binder is swollen, and a step of dispersing the swollen binder in the solvent.

In this case, the binder may be added to the solvent and then is left to stand in the solvent until the binder is in a transparent state. "Transparent state" refers to a state where the opposite side to the swollen binder can be seen through the solvent by visual inspection and includes a semi-transparent state. For example, by leaving the binder to stand in the solvent for 2 hours or more, the binder can be made to be in the "transparent state".

In the first step, a content of the binder may be 0.5 parts by mass to 3.5 parts by mass with respect to 100 parts by mass of the negative electrode active material.

According to a second aspect of the invention, there is provided a method of manufacturing a solid-state battery, the method including: a step of laminating a negative electrode for a solid-state battery which is obtained using the method according to the first aspect, a solid electrolyte layer containing a solid electrolyte, and a positive electrode containing a positive electrode active material.

According to a third aspect of the invention, there is provided a negative electrode slurry containing a negative electrode active material, a sulfide solid electrolyte, a binder, and a solvent. In the negative electrode slurry, the solvent is butyl butyrate, and the binder is a copolymer consisting of a vinylidene fluoride (VDF) monomer unit and a hexafluoropropylene (HFP) monomer unit, in which a molar ratio of the HFP monomer unit to a total amount of the VDF monomer unit and the HFP monomer unit is 10% to 25%.

A content of the binder may be 0.5 parts by mass to 3.5 parts by mass with respect to 100 parts by mass of the negative electrode active material.

In the invention, during the manufacture of a negative electrode for a solid-state battery, a two-component binder of VDF and HFP having a predetermined copolymerization ratio is used as a binder, and butyl butyrate is used as a solvent. According to the invention, it is possible to provide a method of manufacturing a negative electrode for a solid-state battery, and a method of manufacturing a solid-state battery, capable of preventing deterioration of a sulfide solid electrolyte, securing a sufficient adhesive force between a current collector and a negative electrode layer, and suppressing capacity deterioration caused by a negative electrode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
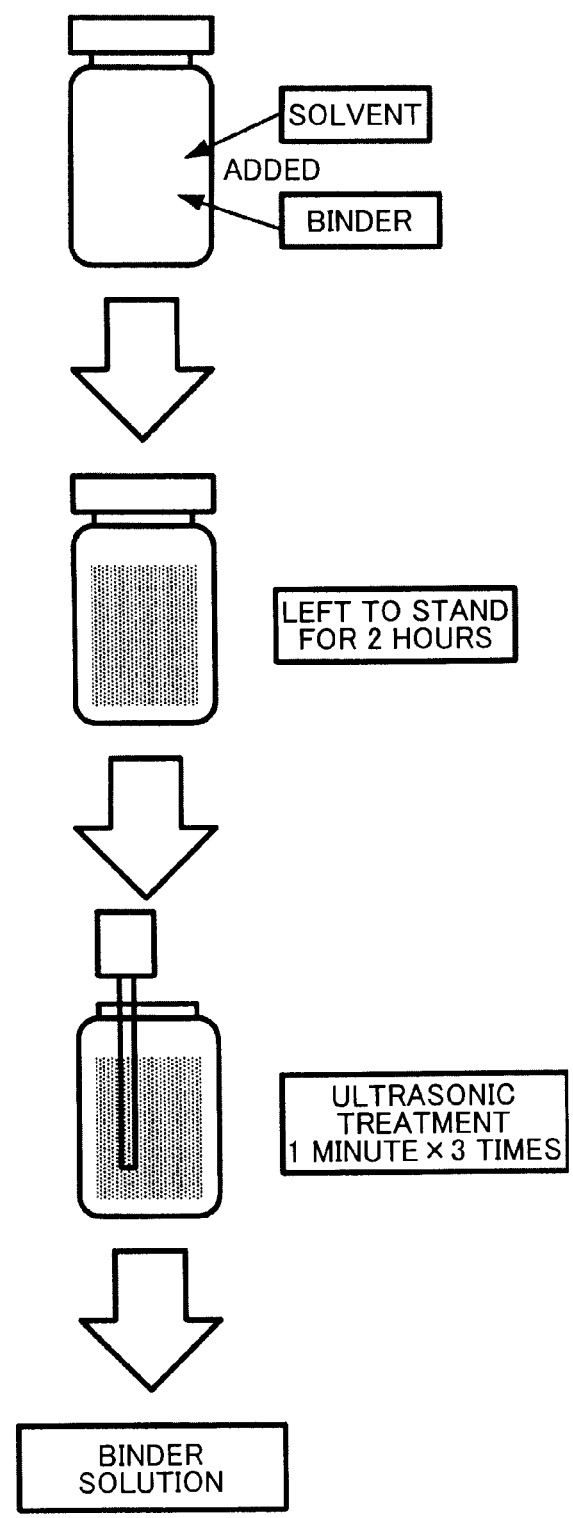
FIG. 1 is a schematic diagram showing the procedure of preparing a binder solution in an example of the invention.

1. Method of Manufacturing Negative Electrode for Solid-State Battery

A method of manufacturing a negative electrode for a solid-state battery according to an embodiment of the invention includes: a step of mixing a negative electrode active material, a sulfide solid electrolyte, a binder, and a solvent with each other to prepare a negative electrode slurry; a step of applying the prepared negative electrode slurry to a surface of a solid electrolyte layer of the solid-state battery or a substrate of the negative electrode; and a step of drying the applied negative electrode slurry. In this method, the solvent is butyl butyrate, and the binder is a copolymer consisting of a vinylidene fluoride (VDF) monomer unit and a hexafluoropropylene (HFP) monomer unit, in which a molar ratio of the HFP monomer unit to a total amount of the VDF monomer unit and the HFP monomer unit is 10% to 25%.

1.1. Step of Preparing Negative Electrode Slurry

In the embodiment of the invention, a negative electrode active material, a sulfide solid electrolyte, a binder, and a solvent are mixed with each other to prepare a negative electrode slurry. Hereinafter, each component constituting the negative electrode slurry will be described.

1.1.1. Negative Electrode Active Material

In the embodiment of the invention, the negative electrode slurry contains a negative electrode active material. As the negative electrode active material, a negative electrode active material which is well-known as a negative electrode active material for a solid-state battery can be used. In particular, a negative electrode active material capable of storing and releasing lithium ions is preferably used. Examples of the negative electrode active material include a lithium alloy, a metal oxide, a carbon material such as graphite or hard carbon, silicon, a silicon alloy, and $Li_4Ti_5O_{12}$. In particular, graphite is preferable. The shape of the negative electrode active material is not particularly limited but is preferably particulate.

1.1.2. Sulfide Solid Electrolyte

In the embodiment of the invention, the negative electrode slurry contains a sulfide solid electrolyte. As the sulfide solid electrolyte, a solid electrolyte containing a sulfur atom in the molecular structure or in the composition which is well-known as a solid electrolyte for a sulfide solid-state battery can be used. In particular, a glass or glass ceramic solid electrolyte containing a sulfide is preferable. For example, a solid electrolyte containing Li, A (A represents at least one of P, Si, Ge, Al, and B), and S is preferable, and a solid electrolyte further containing a halogen atom in addition to the above elements is more preferable. Specific examples of the solid electrolyte include $Li_2S$—$P_2S_5$, $Li_2S$—$P_2S_3$, $Li_2S$—$P_2S_3$—$P_2S_5$, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $LiI$—$Li_2S$—$SiS_2$—$P_2S_5$, $Li_2S$—$SiS_2$—$Li_4SiO_4$, $Li_2S$—$SiS_2$—$Li_3PO_4$, $Li_3PS_4$—$Li_4GeS_4$, $Li_{3.4}P_{0.6}Si_{0.4}S_4$, $Li_{3.25}P_{0.25}Ge_{0.76}S_4$, and $Li_{4-x}Ge_{1-x}P_xS_4$. The shape of the solid electrolyte is not particularly limited but is preferably particulate.

1.1.3. Binder

In the embodiment of the invention, the negative electrode slurry contains a binder. In the embodiment of the invention, a binder which is different from that of the related art is used as the binder. Specifically, a two-component binder consisting of a vinylidene fluoride (VDF) monomer unit and a hexafluoropropylene (HFP) monomer unit is used. As a result, in a solid-state battery obtained from the slurry, a decrease in battery capacity during initial charging can be suppressed.

In the binder used in the embodiment of the invention, it is important to adjust a molar ratio of the HFP monomer unit to the total amount of the VDF monomer unit and the HFP monomer unit to be 10% to 25%. When the molar ratio of the HFP monomer unit is lower than 10%, the binder may not be dispersed well in a solvent (butyl butyrate) described below, and a sufficient adhesive force may not be secured between a negative electrode layer and a current collector. On the other hand, when the molar ratio of the HFP monomer unit is higher than 20%, flexibility increases along with an increase in the copolymerization ratio of HFP, and the binder becomes flexible. That is, in order to cause a binder to appropriately function, a copolymerization ratio (molar ratio) of HFP in the binder is 25% or lower and preferably 20% or lower. Even when the copolymerization ratio of HFP is 25%, the reaction with the sulfide solid electrolyte can be suppressed. In addition, even when the copolymerization ratio of HFP is 25%, the irreversible capacity does not increase because the binder does not contain TFE. Further, the adhesive force of the binder increases along with an increase in the copolymerization ratio of HFP. That is, even when the copolymerization ratio of HFP is 25%, a sufficient adhesive force can be secured. It can be said that the invention can exhibit the remarkable and unique effects when the copolymerization ratio of the binder is in the limited range.

The upper limit of the molecular weight of the binder used in the embodiment of the invention is preferably 1,500,000 or lower, more preferably 910,000 or lower, and still more preferably 700,000 or lower, and the lower limit thereof is preferably 270,000 or higher and more preferably 320,000 or higher. By adjusting the molecular weight of the binder to be in the above-described range, various characteristics of the binder such as the adhesive force can be further improved.

1.1.4. Solvent

In the embodiment of the invention, the negative electrode slurry contains a solvent. In the embodiment of the invention, it is important to use butyl butyrate as the solvent. In butyl butyrate, the above-described specific binder can be dispersed well, and the reaction with the above-described sulfide solid electrolyte can be suppressed.

1.1.5. Other Optional Components

In the embodiment of the invention, the negative electrode slurry may further contain optional components other than the above-described components within a range where the effects of the invention do not deteriorate. Examples of the optional components include a conductive additive.

In the step of preparing a negative electrode slurry, the above-described respective components are mixed with each other to prepare a negative electrode slurry. The mixing order of the respective components is not particularly limited, and it is only necessary to add the respective components to the solvent and to mix the respective components. However, from the viewpoint of obtaining a negative electrode slurry in which the binder is highly dispersed, it is preferable that the respective components are mixed with each other using the following method.

That is, when the step of preparing a negative electrode slurry includes a step of adding the binder to the solvent and then leaving the binder to stand in the solvent such that the binder is swollen, and a step of dispersing the swollen binder in the solvent, the binder can be highly dispersed in the solvent.

It is difficult to dissolve the binder used in the embodiment of the invention in butyl butyrate. However, when the binder is added to butyl butyrate, butyl butyrate penetrates into the binder, and the binder can be swollen over time. As a result of thorough research, the present inventors found that, when a dispersion treatment is performed immediately after the addition of the binder to the solvent without swelling the binder (that is, without leaving the binder to stand in the solvent), the surface of the binder is in a starch-syrup-like state, and the dissolving or dispersing of the binder in the solvent is difficult to perform. Even in this case, a desired negative electrode slurry can be prepared by performing a dispersion treatment for a long period of time; however, for example, the solvent may be evaporated after a long period of dispersion treatment. The present inventors made various attempts to obtain superior dispersibility through a short period of dispersion treatment. As a result, it was found that the dissolving or dispersing of the binder in the solvent is easy to be performed by swelling the binder in butyl butyrate. That is, the binder is added to butyl butyrate and then is left to stand therein such that the binder is swollen, and then a dispersion treatment is performed thereon. As a result, the binder can be highly dispersed in butyl butyrate within a short period of time. Whether or not the binder is swollen can be easily determined by visual inspection. That is, immediately after the addition of the binder to butyl butyrate, the white solid binder can be clearly seen in a lower portion of butyl butyrate. However, the binder becomes swollen over time due to the penetration of butyl butyrate and is in a semi-transparent state. The swelling degree of the binder may be appropriately adjusted depending on, for example, the configuration of an ultrasonic treatment which is performed after the swelling. In this way, by observing a change in the size and color of the binder, whether or not the binder is swollen can be easily determined.

The standing time after the addition of the binder may be the amount of time required to determine that the binder is swollen. Although the standing time slightly varies depending on the configuration of the binder, the binder can be sufficiently swollen by being left to stand in butyl butyrate for 2 hours or longer.

In the embodiment of the invention, it is preferable that the negative electrode slurry is prepared in the following procedure.

(1) The binder is added to butyl butyrate and then is left to stand therein for a predetermined amount of time, and then an ultrasonic treatment is performed thereon. As a result, "a binder solution (slurry)" in which the binder is highly dispersed in butyl butyrate is obtained.

(2) The binder solution obtained in (1) and the negative electrode active material or the sulfide solid electrolyte, which is separately prepared, are added to butyl butyrate, and a dispersion treatment (for example, an ultrasonic treatment) is performed thereon. As a result, "a negative electrode active material-binder slurry" or "a solid electrolyte-binder slurry" in which the negative electrode active material or the sulfide solid electrolyte and the binder are highly dispersed in butyl butyrate is obtained.

(3) The sulfide solid electrolyte or the negative electrode active material is added to "the negative electrode active material-binder slurry" or "the solid electrolyte-binder slurry" obtained in (2), and a dispersion treatment (for example, an ultrasonic treatment) is performed thereon. As a result, "a negative electrode slurry" in which the negative electrode active material, the sulfide solid electrolyte, and the binder are highly dispersed in butyl butyrate is obtained.

In this way, the binder, the negative electrode active material, and the sulfide solid electrolyte are added to butyl butyrate in stages, and the sequential dispersion treatment is performed thereon. As a result, a negative electrode slurry in which the respective components are highly dispersed in the solvent can be easily obtained. Likewise, it is preferable that the optional components (for example, a conductive additive) other than the above-described components are added while performing the sequential dispersion treatment. However, even when the binder, the negative electrode active material, the sulfide solid electrolyte, and the optional components are simultaneously added to butyl butyrate and the dispersion treatment is performed thereon, a desired negative electrode slurry can be obtained. Examples of the configuration of the dispersion treatment include the above-described ultrasonic treatment. Alternatively, for example, a dispersion treatment using a high-speed disk may be used.

In the step of preparing a negative electrode slurry, a mixing ratio of the binder, the negative electrode active material, and the sulfide solid electrolyte is not particularly limited as long as a negative electrode obtained from the slurry appropriately functions. For example, a well-known mixing ratio can be adopted. However, according to the finding of the present inventors, it is particularly preferable that the content of the binder is 0.5 parts by mass to 3.5 parts by mass with respect to 100 parts by mass of the negative electrode active material. When the content of the binder is excessively low, in a negative electrode obtained from the slurry, the adhesion in a negative electrode layer and the adhesion between the negative electrode layer and a current collector are poor, and it may be difficult to handle the negative electrode. On the other hand, when the content of the binder is excessively high, the resistance of a negative electrode increases, and it may be difficult to obtain a solid-state battery having sufficient performance.

In the step of preparing a negative electrode slurry, a ratio of the amount of the solid content (the negative electrode active material, the sulfide solid electrolyte, and the binder) to the amount of the solvent is not particularly limited. For example, the ratio of the amount of the solid content in the negative electrode slurry is preferably 30 mass % to 75 mass %. When the solid content ratio is in the above-described range, a negative electrode can be more easily manufactured. The lower limit of the solid content ratio is more preferably 50 mass % or higher, and the upper limit thereof is more preferably 70 mass % or lower.

1.2. Application of Negative Electrode Slurry

In the embodiment of the invention, the negative electrode slurry prepared as described above is applied. For example, the negative electrode slurry is applied to a substrate. As the substrate, for example, not only a substrate such as a metal foil or a metal mesh which functions as a negative electrode current collector but also a substrate film from which a dry negative electrode layer can be easily peeled off after drying described below may be used. Alternatively, the negative electrode slurry may be applied to a surface of a solid electrolyte layer of a solid-state battery. From the viewpoint of obtaining superior adhesion between a negative electrode layer and a current collector after drying, it is preferable that the negative electrode slurry is applied to a surface of the current collector among the above-described substrates. As the current collector, any material which is well-known as a negative electrode current collector can be used. For example, copper foil can be preferably used.

The application of the negative electrode slurry can be performed using a well-known method. Examples of the method include a method using a spray and a method using a doctor blade. From the viewpoint of uniformly and easily applying the negative electrode slurry to the substrate surface, the method using a doctor blade is preferable.

1.3. Drying of Negative Electrode Slurry

In the embodiment of the invention, the negative electrode slurry applied as described above is dried. As a result, a negative electrode layer containing the negative electrode active material, the sulfide solid electrolyte, and the binder can be formed on the substrate surface, and a negative electrode for a solid-state battery can be obtained. Here, in the embodiment of the invention, butyl butyrate is used as the solvent, and the predetermined two-component binder is used as the binder. Therefore, the adhesion strength of the negative electrode layer is high. That is, the negative electrode layer can be strongly adhered to the substrate surface.

The drying method may be natural drying or fast drying using heating means. From the viewpoint of obtaining superior productivity, fast drying is preferable. The drying temperature and the drying time may be appropriately adjusted depending on, for example, the amount of the solvent contained in the negative electrode slurry and the configuration of the negative electrode layer obtained from the slurry.

The configuration (for example, thickness) of the negative electrode layer formed after drying is not particularly limited as long as it is appropriate for a negative electrode of a sulfide solid-state battery. For example, an electrode having a thickness of 50 μm to 300 μm can be manufactured. Alternatively, an electrode having a thickness which is not in the above-described range may be formed, and an electrode corresponding to the battery design can be manufactured.

As described above, in the method of manufacturing a negative electrode for a solid-state battery according to the embodiment of the invention, the two-component binder of VDF and HFP having the predetermined copolymerization ratio is used as the binder, and butyl butyrate is used as the solvent. Therefore, deterioration of the sulfide solid electrolyte caused by the reaction with the solvent can be suppressed, a sufficient adhesive force can be secured between the current collector and the negative electrode layer, and capacity deterioration of the negative electrode can be suppressed.

2. Method of Manufacturing Solid-State Battery

According to another aspect of the invention, a method of manufacturing a solid-state battery is provided. That is, the method of manufacturing a solid-state battery includes a step of laminating a negative electrode for a solid-state battery which is obtained using the above-described method of manufacturing a negative electrode for a solid-state battery, a solid electrolyte layer containing a solid electrolyte, and a positive electrode containing a positive electrode active material. In the solid-state battery, the negative electrode obtained using the above-described manufacturing method only needs to be used, and the configurations of the components other than the negative electrode are not particularly limited. However, a sulfide all-solid-state battery in which both the solid electrolyte layer and the positive electrode contain the above-described sulfide solid electrolyte is preferable, and a sulfide all-solid-state lithium battery is most preferable.

2.1. Solid Electrolyte Layer

When the solid-state battery is manufactured, it is necessary to form a solid electrolyte layer. The solid electrolyte layer can be easily obtained using a well-known method. For example, a solid electrolyte and a binder are added to a solvent to prepare an electrolyte slurry, and the electrolyte slurry is applied to a substrate and is dried. As a result, a solid electrolyte layer can be formed on the substrate. By removing the substrate from the laminate, the solid electrolyte layer is obtained. Alternatively, the electrolyte slurry may be applied to the surface of the negative electrode to directly form the solid electrolyte layer on the surface of the negative electrode, and the solid electrolyte layer may be directly formed on the surface of the positive electrode described below using the same method. Further, the solid electrolyte layer may be formed without using the electrolyte slurry. That is, the solid electrolyte layer may be obtained by mixing solid electrolyte powder and a binder with each other using a dry method and press-forming the mixture by, for example, hot pressing.

In the invention, the configuration of the solid electrolyte layer is not particularly limited. During the formation of the solid electrolyte layer, as the binder and the solvent used in the electrolyte slurry, a binder and a solvent other than the binder and butyl butyrate contained in the negative electrode slurry may also be used. For example, butadiene rubber may be used as the binder, and heptane may be used as the solvent. In addition, the solid electrolyte used in the solid electrolyte layer is not limited to the sulfide solid electrolyte. For example, the solid electrolyte layer may be formed using an oxide solid electrolyte. However, from the viewpoint of obtaining a solid-state battery having higher performance, it is preferable that the solid electrolyte layer is formed by using the sulfide solid electrolyte as the solid electrolyte.

2.2. Positive Electrode

When the solid-state battery is manufactured, it is necessary to manufacture a positive electrode. The positive electrode can be easily obtained using a well-known method. For example, a positive electrode active material, a solid electrolyte, and a binder are added to a solvent to prepare a positive electrode slurry, and the positive electrode slurry is applied to a substrate and is dried. As a result, a positive electrode layer can be formed on the substrate. In this case, as in the case of the formation of the negative electrode layer, various substrates such as a current collector can be used as the substrate. As the current collector, any material which is well-known as a positive electrode current collector can be used. For example, aluminum foil can be preferably used. Alternatively, the positive electrode slurry may be applied to the surface of the solid electrolyte layer to directly form the positive electrode layer on the surface of the solid electrolyte layer. Further, the positive electrode may be manufactured without using the positive electrode slurry. That is, the positive electrode layer may be obtained by mixing positive electrode active material powder, solid electrolyte powder, and a binder with each other using a dry method and press-forming the mixture on the current collector by, for example, hot pressing. Alternatively, after the positive electrode layer is obtained by hot pressing, the current collector may be attached to the surface of the positive electrode layer.

In the invention, the configuration of the positive electrode is not particularly limited. During the manufacture of the positive electrode, as the binder and the solvent used in the positive electrode slurry, a binder and a solvent other than the binder and butyl butyrate contained in the negative electrode slurry may also be used. In addition, as the positive electrode active material, a material which is well-known as a positive electrode active material for a solid-state battery may be used. In particular, a positive electrode active material capable of storing and releasing lithium ions is preferably used. For example, a composite oxide containing Li may be used. The solid electrolyte contained in the positive electrode is not particularly limited, and an oxide solid electrolyte may also be used in addition to the sulfide solid electrolyte. However, from the viewpoint of obtaining a solid-state battery having higher performance, it is preferable that the positive electrode is manufactured by using the sulfide solid electrolyte as the solid electrolyte.

The positive electrode, the solid electrolyte layer, and the negative electrode which are obtained as described above are punched into predetermined sizes and are laminated to obtain a laminate. This laminate is press-formed under an appropriate pressure to be integrated. As a result, a power generation unit including the positive electrode, the solid electrolyte layer, and the negative electrode in this order can be manufactured. Appropriate terminals and the like are provided in the power generation unit. Next, for example, the power generation unit is accommodated in a battery case. As a result, a solid-state battery can be easily manufactured. Here, in the embodiment of the invention, a high adhesive force can be secured between the negative electrode layer and the current collector in the negative electrode. Therefore, during the punching of the negative electrode, the cracking or peeling of the negative electrode can be suppressed. In addition, in the embodiment of the invention, the binder contained in the negative electrode does not contain TFE. Accordingly, a decrease in battery capacity during the initial charging of the solid-state battery can be suppressed.

3. Negative Electrode Slurry

According to still another aspect of the invention, a negative electrode slurry for a solid-state battery is provided. That is, the negative electrode slurry contains a negative electrode active material, a sulfide solid electrolyte, a binder, and a solvent. In the negative electrode slurry, the solvent is butyl butyrate, and the binder is a copolymer consisting of a vinylidene fluoride (VDF) monomer unit and a hexafluoropropylene (HFP) monomer unit, in which a molar ratio of the HFP monomer unit to a total amount of the VDF monomer unit and the HFP monomer unit is 10% to 25%. Since the details of the respective components are as described above, the description thereof will not be repeated.

As described above, in the negative electrode slurry according to the embodiment of the invention, the two-component binder of VDF and HFP having the predetermined copolymerization ratio is used as the binder, and butyl butyrate is used as the solvent. Therefore, deterioration of the sulfide solid electrolyte caused by the reaction with the solvent can be suppressed. When a negative electrode is obtained from the slurry, a sufficient adhesive force can be secured between a current collector and a negative electrode layer. When a solid-state battery is obtained from the slurry, capacity deterioration caused by a negative electrode during initial charging can be suppressed.

Hereinafter, the invention will be described in more detail using Examples but is not limited to the following Examples.

1. Problem of Binder in Related Art

A negative electrode was manufactured by using a three-component copolymer consisting of a VDF monomer unit, a TFE monomer unit, and a HFP monomer unit as a binder, and a solid-state battery was manufactured using the negative electrode. When this solid-state battery was charged and discharged, a plateau derived from a side reaction during initial charging was observed at around 3 V, and the battery capacity decreased. As a result of thorough research, the present inventors presumed that this phenomenon occurred because the TFE component contained in the binder was reduced and decomposed during initial charging. Therefore, the use of a two-component binder consisting of VDF and HFP without a TFE component was considered.

2. Manufacture of Negative Electrode 2.1. Preparation of Binder Solution

A binder solution was prepared in the procedure shown in FIG. 1. The details are as follows.

Preparation Example 1

Powder of polyvinylidene fluoride (PVDF, VDF 100%) was added to butyl methacrylate (manufactured by Kishida Chemical Co., Ltd.), and the components were stirred overnight. As a result, a binder solution (1) was prepared. Here, the content of the binder was 20 mass % with respect to 100 mass % of the total amount of the binder solution (1). PVDF was not able to be dissolved or dispersed in butyl butyrate. Therefore, as a solvent for the binder solution, butyl methacrylate was used instead of butyl butyrate.

Preparation Example 2

Three-component binder powder obtained by copolymerizing VDF, TFE, and HFP at a ratio of 55 mol %:25 mol %:20 mol % was prepared. This binder powder was added to butyl butyrate (manufactured by Kishida Chemical Co., Ltd.), and the components were stirred overnight such that the binder was dissolved in the solvent. As a result, a binder solution (2) was prepared. Here, the content of the binder was 5 mass % with respect to 100 mass % of the total amount of the binder solution (2).

Preparation Example 3

Two-component binder powder obtained by copolymerizing HFP and VDF at a ratio of 10 mol %:90 mol % was prepared. This binder powder was added to butyl butyrate (manufactured by Kishida Chemical Co., Ltd.), the binder was left to stand in butyl butyrate for two hours such that the binder was swollen, and then an ultrasonic treatment (1 minute) was performed thereon three times using an ultrasonic homogenizer (UD50 (50 W) manufactured by SMT Corporation). As a result, a binder solution (3) was prepared. Here, the content of the binder was 5 mass % with respect to 100 mass % of the total amount of the binder solution (3). The binder was not completely dissolved in butyl butyrate and was highly dispersed therein.

Preparation Example 4

Two-component binder powder obtained by copolymerizing HFP and VDF at a ratio of 15 mol %:85 mol % was prepared. This binder powder was added to butyl butyrate (manufactured by Kishida Chemical Co., Ltd.), the binder was left to stand in butyl butyrate for two hours such that the binder was swollen, and then an ultrasonic treatment (1 minute) was performed thereon three times using an ultrasonic homogenizer (UD50 (50 W) manufactured by SMT Corporation). As a result, a binder solution (4) was prepared. Here, the content of the binder was 5 mass % with respect to 100 mass % of the total amount of the binder solution (4). The binder was not completely dissolved in butyl butyrate and was highly dispersed therein.

Preparation Example 5

Two-component binder powder obtained by copolymerizing HFP and VDF at a ratio of 20 mol %:80 mol % was prepared. This binder powder was added to butyl butyrate (manufactured by Kishida Chemical Co., Ltd.), the binder was left to stand in butyl butyrate for two hours such that the binder was swollen, and then an ultrasonic treatment (1 minute) was performed thereon three times using an ultrasonic homogenizer (UD50 (50 W) manufactured by SMT Corporation). As a result, a binder solution (5) was prepared. Here, the content of the binder was 5 mass % with respect to 100 mass % of the total amount of the binder solution (5). The binder was not completely dissolved in butyl butyrate and was highly dispersed therein.

2.2. Preparation of Negative Electrode Slurry

Figure 2:
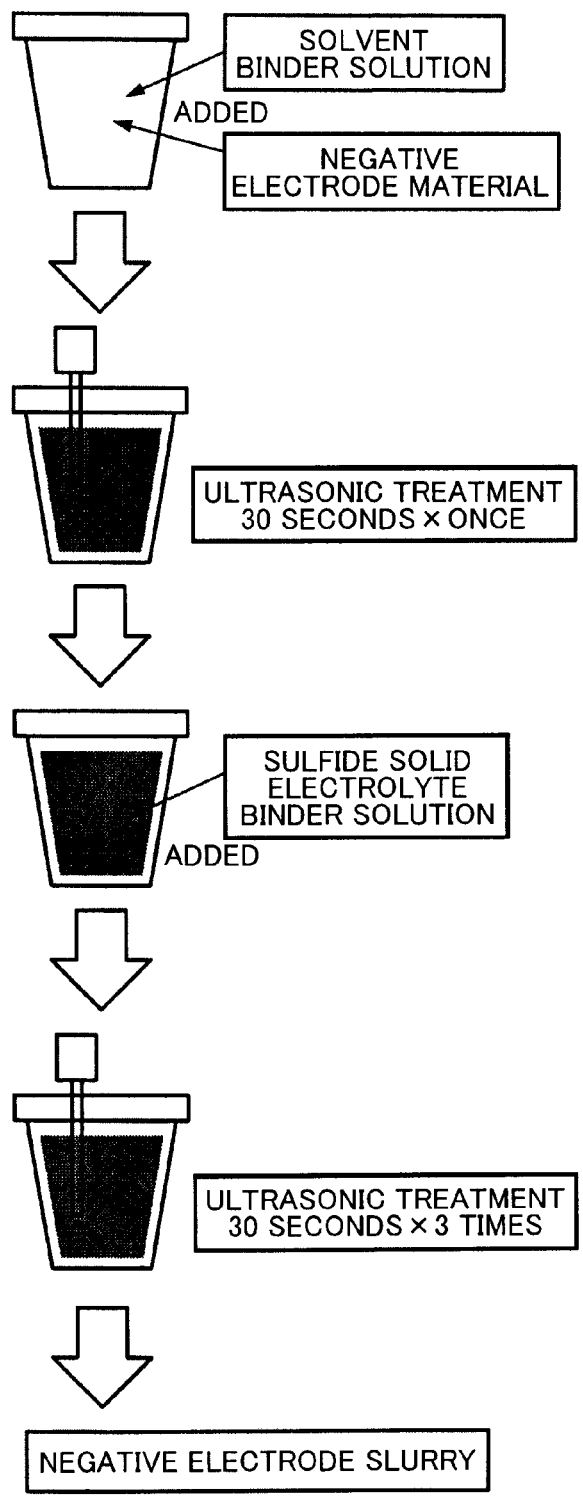
FIG. 2 is a schematic diagram showing the procedure of preparing a negative electrode slurry in an example of the invention.

Using the prepared binder solutions, negative electrode slurries according to Examples and Comparative Examples were prepared in the procedure shown in FIG. 2. The details are as follows.

Comparative Example 1

In a 9 ml PET container, the binder solution (1) according to Preparation Example 1 and graphite (manufactured by Mitsubishi Chemical Corporation) as a negative electrode active material were added to butyl butyrate (manufactured by Kishida Chemical Co., Ltd.) as a solvent, and an ultrasonic treatment (30 seconds) was performed thereon once using an ultrasonic homogenizer (UD50 (50 W) manufactured by SMT Corporation). As a result, "a negative electrode active material-binder slurry" was prepared. In Comparative Example 1, butyl methacrylate was used as the solvent in the binder solution (1). As a result, the solvent in "the negative electrode active material-binder slurry" and the "negative electrode slurry" was a mixed solvent of butyl methacrylate and butyl butyrate.

The binder solution (1) according to Preparation Example 1 and a sulfide solid electrolyte (30LiI.70 (0.75Li$_2$S.0.25P$_2$S$_5$) were added to the obtained negative electrode active material-binder slurry, and an ultrasonic treatment (30 seconds) was performed thereon three times using an ultrasonic homogenizer (UD50 (50 W) manufactured by SMT Corporation). As a result, "a negative electrode slurry" in which the negative electrode active material, the sulfide solid electrolyte, and the binder were highly dispersed was obtained. Here, the content of butyl methacrylate was 13 mass % with respect to the total amount of the solvent.

In the finally obtained negative electrode slurry, a solid content ratio was 63 mass %. In addition, regarding the content ratio of the binder to the negative electrode active material, the amount of the binder was 3.5 parts by mass with respect to 100 parts by mass of the negative electrode active material (in the following Examples and Comparative Examples, the mass ratios and the solid content ratios were the same).

Comparative Example 2

A negative electrode slurry was obtained in the same procedure as that of Comparative Example 1, except that N-methylpyrrolidone (NMP) was used as the solvent instead of butyl butyrate (nBB).

Comparative Example 3

A negative electrode slurry was obtained in the same procedure as that of Comparative Example 1, except that dibutyl ether (DBE) was used as the solvent instead of butyl butyrate (nBB).

Comparative Example 4

A negative electrode slurry was obtained in the same procedure as that of Comparative Example 1, except that cyclopentyl methyl ether (CPME) was used as the solvent instead of butyl butyrate (nBB).

Comparative Example 5

A negative electrode slurry was obtained in the same procedure as that of Comparative Example 1, except that the binder solution (2) was used instead of the binder solution (1).

Comparative Example 6

A negative electrode slurry was obtained in the same procedure as that of Comparative Example 5, except that N-methylpyrrolidone (NMP) was used as the solvent instead of butyl butyrate (nBB).

Comparative Example 7

A negative electrode slurry was obtained in the same procedure as that of Comparative Example 5, except that dibutyl ether (DBE) was used as the solvent instead of butyl butyrate (nBB).

Comparative Example 8

A negative electrode slurry was obtained in the same procedure as that of Comparative Example 5, except that cyclopentyl methyl ether (CPME) was used as the solvent instead of butyl butyrate (nBB).

Comparative Example 9

A negative electrode slurry was obtained in the same procedure as that of Comparative Example 1, except that the binder solution (3) was used instead of the binder solution (1), and N-methylpyrrolidone (NMP) was used as the solvent instead of butyl butyrate (nBB).

Comparative Example 10

A negative electrode slurry was obtained in the same procedure as that of Comparative Example 9, except that dibutyl ether (DBE) was used as the solvent instead of N-methylpyrrolidone (NMP).

Comparative Example 11

A negative electrode slurry was obtained in the same procedure as that of Comparative Example 9, except that cyclopentyl methyl ether (CPME) was used as the solvent instead of N-methylpyrrolidone (NMP).

Comparative Example 12

A negative electrode slurry was obtained in the same procedure as that of Comparative Example 1, except that the binder solution (5) was used instead of the binder solution (1), and N-methylpyrrolidone (NMP) was used as the solvent instead of butyl butyrate (nBB).

Comparative Example 13

A negative electrode slurry was obtained in the same procedure as that of Comparative Example 12, except that dibutyl ether (DBE) was used as the solvent instead of N-methylpyrrolidone (NMP).

Comparative Example 14

A negative electrode slurry was obtained in the same procedure as that of Comparative Example 12, except that cyclopentyl methyl ether (CPME) was used as the solvent instead of N-methylpyrrolidone (NMP).

Example 1

A negative electrode slurry was obtained in the same procedure as that of Comparative Example 1, except that the binder solution (3) was used instead of the binder solution (1).

Example 2

A negative electrode slurry was obtained in the same procedure as that of Comparative Example 1, except that the binder solution (4) was used instead of the binder solution (1).

Example 3

A negative electrode slurry was obtained in the same procedure as that of Comparative Example 1, except that the binder solution (5) was used instead of the binder solution (1).

2.3. Application and Drying of Negative Electrode Slurry

Each of the negative electrode slurries was applied to copper foil as a negative electrode current collector using a doctor blade and was dried. As a result, a negative electrode layer having a thickness of 100 μm was formed on a surface of the negative electrode current collector, and a negative electrode was obtained.

3. Preparation of Positive Electrode

A positive electrode slurry was prepared by using butyl butyrate (manufactured by Kishida Chemical Co., Ltd.) as a solvent, using a three-component active material (manufactured by Nichia Corporation) as a positive electrode active material, using the above-described sulfide solid electrolyte as a solid electrolyte, and using the above-described three-component binder as the binder. The prepared positive electrode slurry was applied to aluminum foil as a positive electrode current collector using a doctor blade and was dried. As a result, a positive electrode layer having a thickness of 80 μm was formed on a surface of the positive electrode current collector, and a positive electrode was obtained. In the positive electrode layer, a mass ratio (positive electrode active material:binder) of the positive electrode active material to the binder was 100:2.5.

The positive electrode slurry was prepared as follows. That is, a conductive additive and the binder were added to butyl butyrate as the solvent, and an ultrasonic treatment (30 seconds) was performed thereon once using an ultrasonic homogenizer (UD50 (50 W) manufactured by SMT Corporation). As a result, a slurry was obtained. The solid electrolyte was added to the obtained slurry, and an ultrasonic treatment (30 seconds) was performed thereon twice using the ultrasonic homogenizer. Further, the positive electrode active material was added to the slurry, and the same ultrasonic treatment (30 seconds) was performed thereon twice. The positive electrode slurry in which the positive electrode active material, the solid electrolyte, and the binder were highly dissolved or dispersed was obtained. At this time, the solid content ratio was 60%.

4. Preparation of Solid Electrolyte Layer

An electrolyte slurry was prepared by using heptane as a solvent, using the above-described sulfide solid electrolyte as a solid electrolyte, and using a heptane solution of butadiene rubber as a binder solution. The prepared electrolyte slurry was applied to a peelable substrate (aluminum foil) using a doctor blade and was dried. As a result, a solid electrolyte layer having a thickness of 40 μm was formed on the substrate. In the solid electrolyte layer, a mass ratio (solid electrolyte:binder) of the solid electrolyte to the binder was 100 parts by mass:1 part by mass.

The electrolyte slurry was prepared as follows. That is, the solid electrolyte and the binder solution were added to heptane as the solvent, and an ultrasonic treatment (30 seconds) was performed thereon once using an ultrasonic homogenizer (UD50 (50 W) manufactured by SMT Corporation). As a result, the electrolyte slurry in which the solid electrolyte and the binder were highly dissolved or dispersed was obtained. At this time, the solid content ratio was 37%.

5. Preparation of Solid-State Battery

Figure 3:
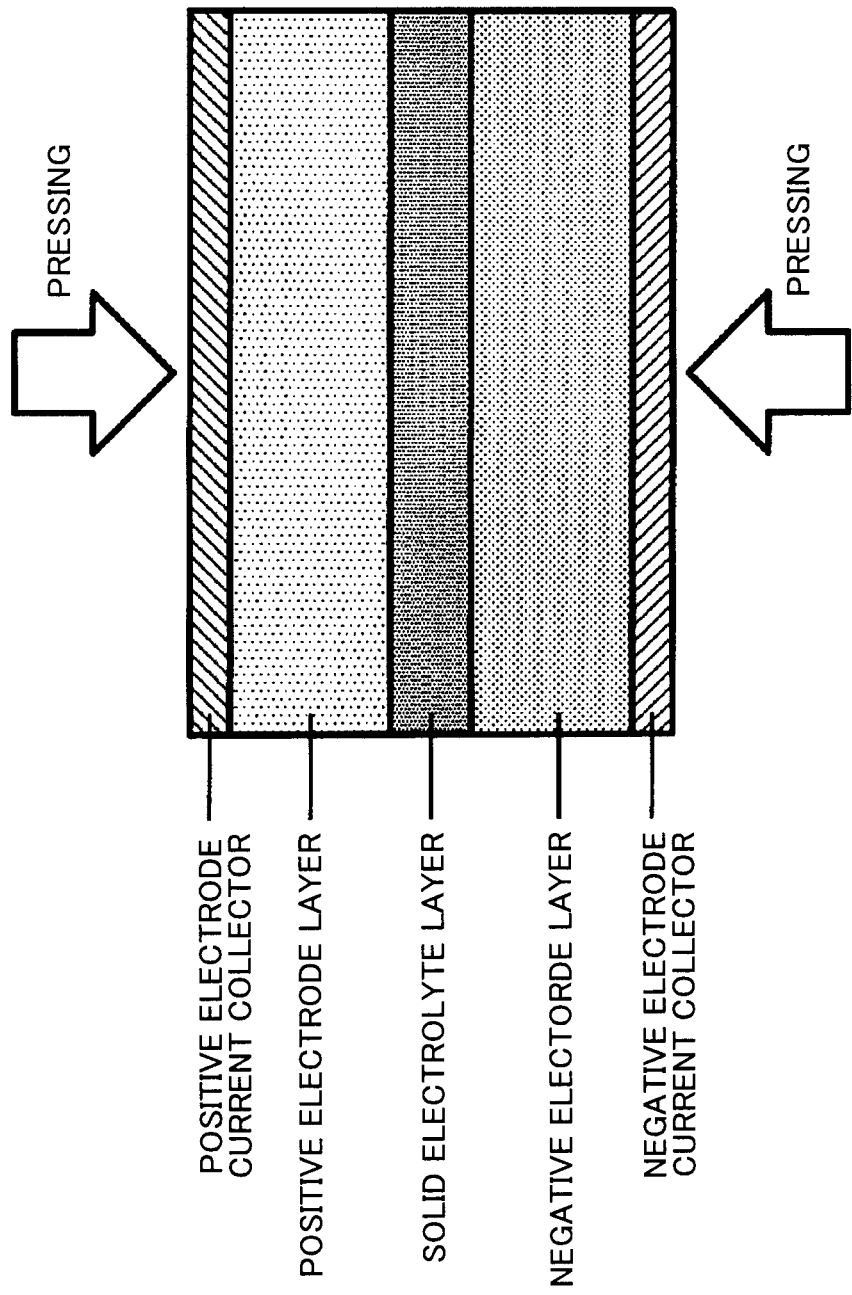
FIG. 3 is a schematic diagram showing the procedure of manufacturing a solid-state battery in an example of the invention.

The positive electrode, the negative electrode, and the solid electrolyte layer prepared as described above were punched. Next, as shown in FIG. 3, the positive electrode and the negative electrode were laminated to face each other with the solid electrolyte layer, from which the substrate was removed, interposed therebetween. The obtained laminate was pressed to be integrated. As a result, a solid-state battery was prepared.

6. Performance Evaluation 6.1. Effect of Combination of Solvent and Binder on Battery Performance (1) Evaluation of Reactivity Between Solvent and Electrolyte The sulfide solid electrolyte was in contact with the solvent for a predetermined amount of time. A lithium ion conductivity in the sulfide solid electrolyte before the contact with the solvent and a lithium ion conductivity in the sulfide solid electrolyte after the contact with the solvent were measured, and the reactivity between the solvent and the electrolyte was evaluated. The evaluation criteria were as follows.

Figure 4:
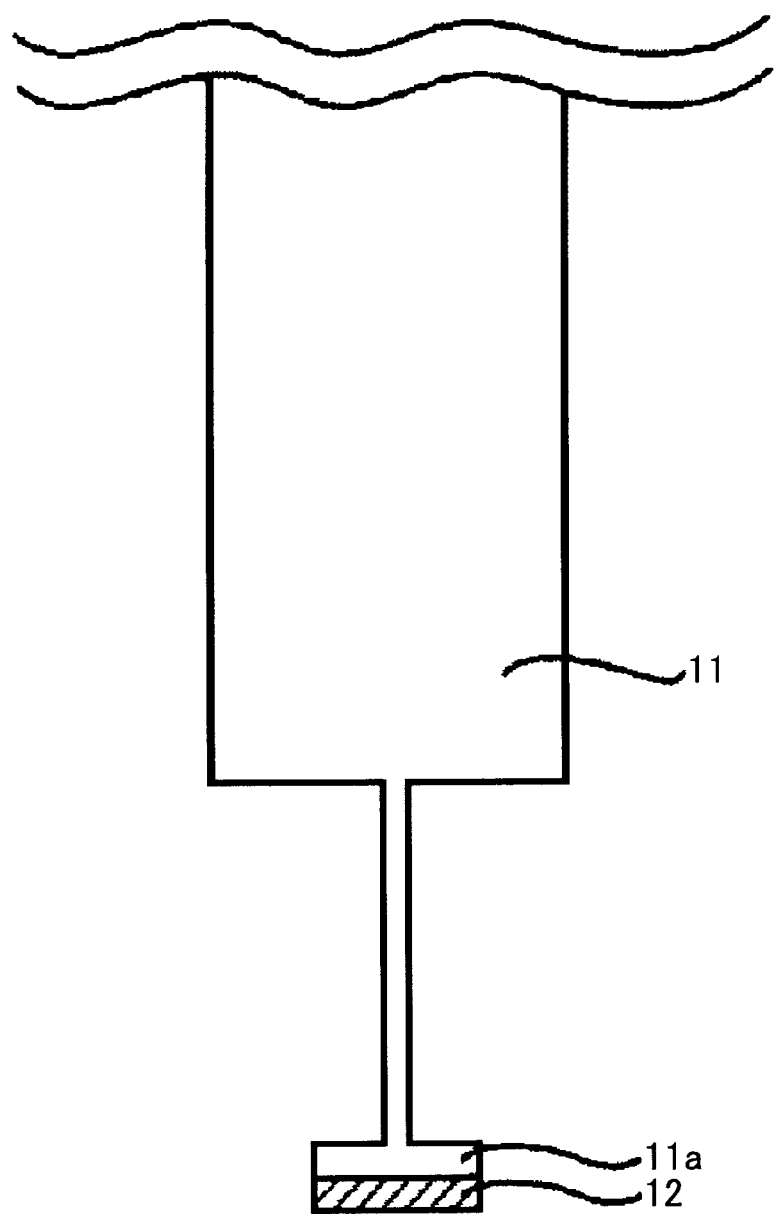
FIG. 4 is a schematic diagram showing a method of a vertical peel test for evaluating the adhesive force of a negative electrode.
Figure 4:
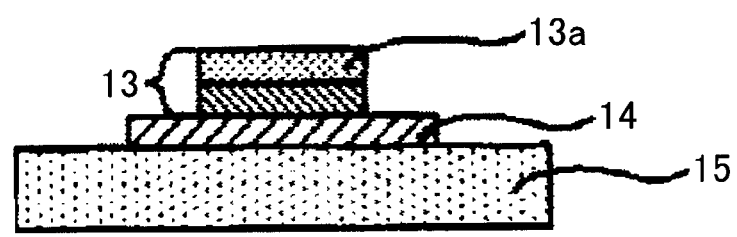

O: The Li ion conductivity after the content was maintained to be 90% or higher as compared to that before the contact X: Due to the reaction between the solvent and the electrolyte, the electrode was not able to be formed, and the Li ion conductivity was not able to be measured (2) Evaluation of Adhesive Force The adhesive force between the negative electrode current collector and the negative electrode layer was evaluated. Specifically, using a tensile load measuring device (RX-5/MODEL-2257, manufactured by AIKOH Engineering Co., Ltd.), a vertical peel test was performed in a glove box in an argon atmosphere at room temperature. FIG. 4 is a schematic sectional diagram showing the summary of the configuration of measuring the adhesive force. In FIG. 4, a double wavy line represents omission in the drawing. First, a sample 13 was fixed to a stand 15 through a double-sided adhesive tape 14 such that a surface 13a (negative electrode layer) to which the negative electrode slurry was applied faced upward. Another double-sided adhesive tape 12 was attached to an attachment tip end portion 11a of the tensile load measuring device 11, and an adhesive surface of the double-sided adhesive tape was positioned to face the sample 13 side. The tensile load measuring device 11 was lowered at the constant speed (about 20 mm/min) vertically to the sample 13 such that the double-sided adhesive tape 12 came into contact with the surface 13a (negative electrode layer) to which the negative electrode slurry was applied. Next, the tensile load measuring device 11 was raised. When the coating film (negative electrode layer) was peeled off, the tensile load was obtained as the adhesive force of the sample. The adhesive force was evaluated as the following evaluation criteria.

O: more than 10 N/cm$^2$

Δ: 2 N/cm$^2$ to 10 N/cm$^2$

X: less than 2 N/cm$^2$ (3) Evaluation of Negative Electrode Capacity

The prepared solid-state battery was charged and discharged, and whether or not the negative electrode capacity decreased during initial charging was evaluated. The evaluation criteria were as follows.

O: Capacity not decreased

X: Capacity decreased

The evaluation results are shown in Table 1 below.

TABLE 1

| | Solvent | Kind of Binder | Binder Composition (mol %) | Reactivity with Electrolyte | Adhesive Force | Decrease in Negative Electrode Capacity |
|---|---|---|---|---|---|---|
| Comparative Example 1 | nBB | PVDF | VDF 100 | ○ | X | ○ |
| Comparative Example 2 | NMP | PVDF | VDF 100 | X | Not Able to Manufacture Negative Electrode | Not Able to Manufacture Battery |
| Comparative Example 3 | DBE | PVDF | VDF 100 | ○ | X | Not Able to Manufacture Battery |
| Comparative Example 4 | CPME | PVDF | VDF 100 | ○ | X | ○ |
| Comparative Example 5 | nBB | VDF/TFE/HFP | VDF:TFE:HFP = 55:25:20 | ○ | Δ | X |
| Comparative Example 6 | NMP | VDF/TFE/HFP | VDF:TFE:HFP = 55:25:20 | X | Not Able to Manufacture Negative Electrode | Not Able to Manufacture Battery |
| Comparative Example 7 | DBE | VDF/TFE/HFP | VDF:TFE:HFP = 55:25:20 | ○ | X | Not Able to Manufacture Battery |
| Comparative Example 8 | CPME | VDF/TFE/HFP | VDF:TFE:HFP = 55:25:20 | ○ | X | Not Able to Manufacture Battery |
| Comparative Example 9 | NMP | VDF/HFP | VDF:HFP = 90:10 | X | Not Able to Manufacture Negative Electrode | Not Able to Manufacture Battery |
| Comparative Example 10 | DBE | VDF/HFP | VDF:HFP = 90:10 | ○ | X | Not Able to Manufacture Battery |
| Comparative Example 11 | CPME | VDF/HFP | VDF:HFP = 90:10 | ○ | X | Not Able to Manufacture Battery |
| Comparative Example 12 | NMP | VDF/HFP | VDF:HFP = 80:20 | X | Not Able to Manufacture Negative Electrode | Not Able to Manufacture Battery |
| Comparative Example 13 | DBE | VDF/HFP | VDF:HFP = 80:20 | ○ | X | Not Able to Manufacture Battery |
| Comparative Example 14 | CPME | VDF/HFP | VDF:HFP = 80:20 | ○ | X | Not Able to Manufacture Battery |
| Example 1 | nBB | VDF/HFP | VDF:HFP = 90:10 | ○ | ○ | ○ |
| Example 2 | nBB | VDF/HFP | VDF:HFP = 85:15 | ○ | ○ | ○ |
| Example 3 | nBB | VDF/HFP | VDF:HFP = 80:20 | ○ | ○ | ○ |

<Evaluation Results of Reactivity Between Solvent and Electrolyte>

As shown in Table 1, when nBB, DBE, or CPME is used as the solvent, the reaction between the solvent and the sulfide solid electrolyte was able to be suppressed. On the other hand, when NMP was used as the solvent (Comparative Examples 2, 6, 9, and 12), the solvent and the sulfide solid electrolyte reacted with each other, and it was difficult to manufacture the negative electrode. Specifically, after being dissolved in the solvent, the sulfide solid electrolyte was maintained in sticky state and was not able to be dried. Of course, the solid-state battery was not able to be manufactured.

<Evaluation Results of Adhesive Force>
(When nBB was Used as the Solvent)

As shown in Table 1, when nBB was used as the solvent, the adhesion largely varied depending on the kind of the binder. Specifically, when PVDF was used as the binder (Comparative Example 1), the adhesive force between the negative electrode layer and the current collector was lower than 2 N/cm$^2$. When the negative electrode was punched during the manufacture of the solid-state battery, the peeling or cracking of the negative electrode was observed, and the yield may decrease during the manufacture of the solid-state battery. In addition, when the three-component binder consisting of VDF, TFE, and HFP was used as the binder (Comparative Example 5), the adhesive force was 2 N/cm$^2$ or higher. However, when the negative electrode was punched during the manufacture of the solid-state battery, the peeling or cracking of the negative electrode was observed at predetermined intervals, and a sufficient adhesive force was not able to be obtained. On the other hand, when the two-component binder, which was obtained by copolymerizing VDF and HFP at a predetermined ratio, was used as the binder (Examples 1 to 3), the adhesive force was significantly improved. In addition, when the negative electrode was punched during the manufacture of the solid-state battery, substantially no peeling or cracking of the negative electrode occurred.

Figure 5:
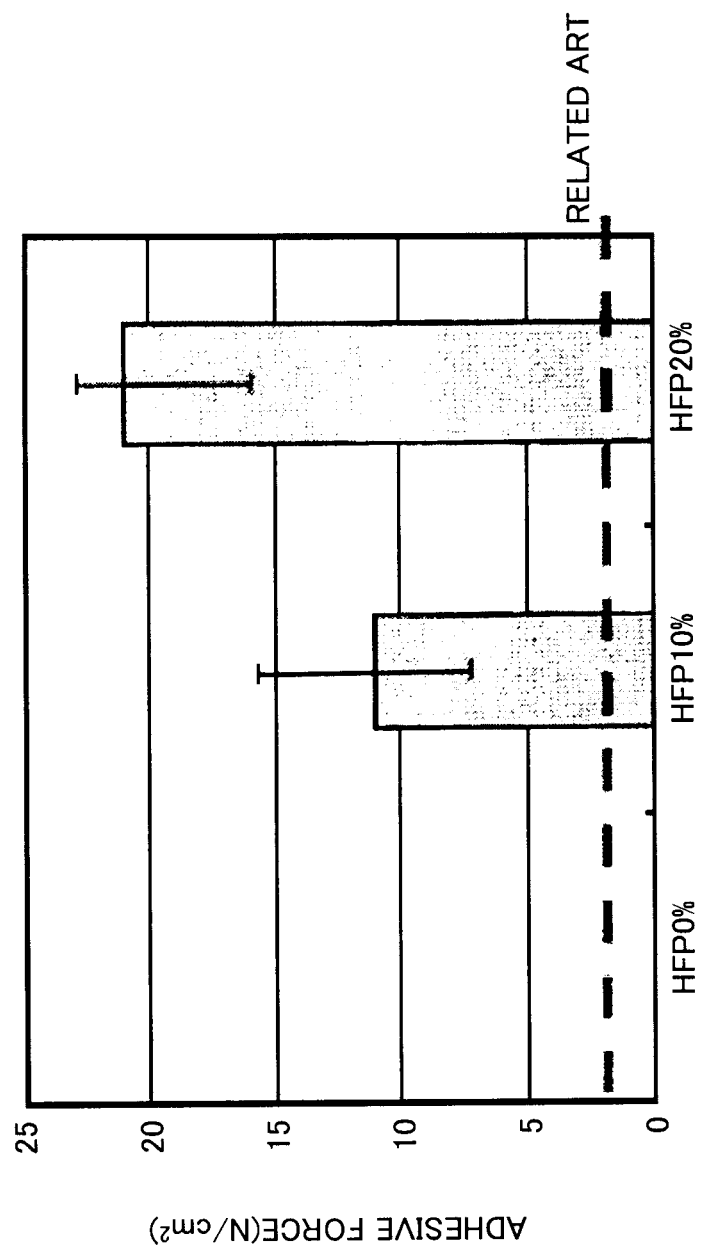
FIG. 5 is a diagram showing the results of evaluating the adhesive force.

FIG. 5 shows the comparison results of the adhesive force of the negative electrode when butyl butyrate was used as the solvent, and when PVDF (HFP: 0%), a two-component binder (HFP: 10%), a two-component binder (HFP: 20%), or a three-component binder of the related art was used as the binder. It can be clearly seen from FIG. 5 that an extremely high adhesive force can be obtained when butyl butyrate was used as the solvent, and when a two-component binder containing 10 mol % to 20 mol % of HFP was used as the binder.

(When NMP was Used as the Solvent)

As described above, when NMP was used as the solvent (Comparative Examples 2, 6, 9, and 12), the problem of the sticky state of the sulfide solid electrolyte was not able to be solved, and the negative electrode was not able to be manufactured.

(When DBE was Used as the Solvent)

As shown in Table 1, when DBE was used as the solvent, a sufficient adhesive force was not able to be obtained irrespective of the kind of the binder. Specifically, when PVDF was used as the binder (Comparative Example 3), when the three-component binder consisting of VDF, TFE, and HFP was used as the binder (Comparative Example 7), or when the two-component binder consisting of VDF and HFP was used as the binder (Comparative Examples 10 and 13), the negative electrode was able to be manufactured, but the adhesive force was so low that the negative electrode was not able to be punched.

(When CPME was Used as the Solvent)

As shown in Table 1, when CPME was used as the solvent, a sufficient adhesive force was not able to be obtained irrespective of the kind of the binder. As compared to a case where DBE was used as the solvent, the adhesive force was slightly improved, and the negative electrode was able to be punched only in a small number of the examples.

<Evaluation Results of Decrease in Negative Electrode Capacity During Initial Charging>

As clearly seen from the results of Table 1, the solid-state battery was able to be manufactured only in Comparative Examples 1, 4, and 5 and Examples 1 to 3. However, when the three-component binder consisting of VDF, TFE, and HFP was used as the binder, a plateau was observed at around 3 V, during the initial charging of the solid-state battery, and a decrease in negative electrode capacity was observed. Regarding the other binders, a plateau was not observed, and the negative electrode capacity did not decrease. Specifically, in the solid-state batteries according to Examples, the initial charging efficiency (discharge capacity/charge-discharge capacity) was able to be improved by about 2% as compared to the that in the related art.

The following facts were found from the above results. During the manufacture of a negative electrode for a solid-state battery, in the negative electrode slurry, only when a two-component binder of VDF and HFP having a copolymerization ratio (molar ratio) of HFP of 10% to 20% is used as a binder, and when butyl butyrate is used as a solvent, deterioration of a sulfide solid electrolyte can be suppressed, a sufficient adhesive force can be secured between a current collector and a negative electrode layer, and capacity deterioration of a negative electrode can be suppressed.

6.2. Regarding Preparation of Binder Solution During Preparation of Slurry

In the description of all the Examples, the two-component binder was added to butyl butyrate and was left to stand therein for a predetermined amount of time such that the binder was swollen, and the ultrasonic treatment was performed thereon. Hereafter, the effects of the above-described configuration will be described.

Figure 6A:
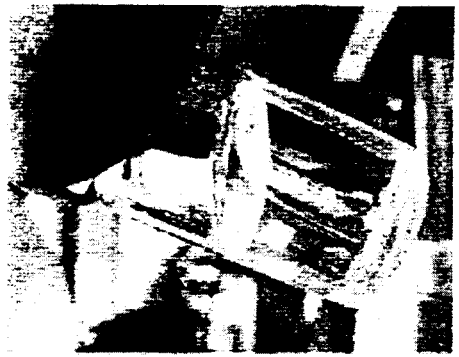
FIGS. 6A to 6C are diagrams showing the swelling of a two-component binder in butyl butyrate.
Figure 6B:
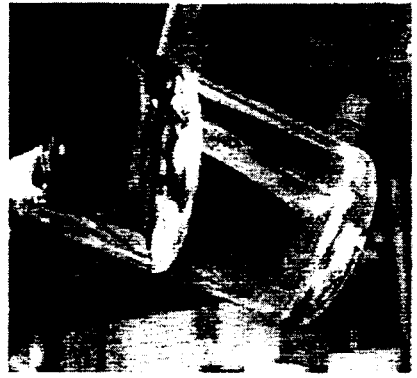
Figure 6C:
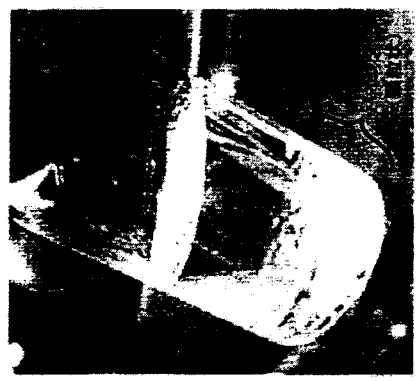
Figure 7:
FIG. 7 is a diagram showing the state of lumps (undissolved lumps) produced when an ultrasonic treatment was performed for a short period of time while maintaining a two-component binder not in a non-swollen state in butyl butyrate.

As shown in FIG. 6A, immediately after the two-component binder is added to butyl butyrate, the white granular (less than 2 mm) binder is precipitated on the lower side of butyl butyrate. However, butyl butyrate penetrates into the binder over time, and the binder is swollen to be in a semi-transparent state (FIG. 6B). At this time, due to the swollen semi-transparent binder, the lower side of butyl butyrate becomes foggy. In a state where the binder is swollen, an ultrasonic treatment is performed. As a result, the binder can be highly dispersed in butyl butyrate within the above-described short period of time of 3 minutes (FIG. 6C). On the other hand, immediately after the binder is added to butyl butyrate, an ultrasonic treatment is performed in a state where the binder is not swollen. In this case, surfaces of binder particles were in a starch-syrup-like state, and the binder cannot be highly dispersed within a short period of time. For example, when an ultrasonic treatment is performed for 3 minutes, as shown in FIG. 7, binder particles aggregated, and lumps (undissolved lumps) were produced. When the ultrasonic treatment is continued, a binder solution in which the binder is highly dispersed in butyl butyrate is obtained after a long period of time of 30 minutes (ten times that of the case where the swelling treatment is performed). However, when the ultrasonic treatment is performed for a long period of time, the solvent temperature may increase to cause evaporation. That is, from the viewpoints of obtaining productivity and avoiding problems such as concentration deviation, it is preferable that the treatment time is as short as possible.

It can be seen from the above results that the following configuration is preferable: during the preparation of the negative electrode slurry, it is preferable that the binder is caused to be dispersed in the solvent by adding the binder to butyl butyrate, leaving the binder to stand in butyl butyrate such that the binder is swollen, and then performing an ultrasonic treatment thereon. In particular, it is preferable that the binder is added to the solvent and then is left to stand in the solvent until the binder is in a transparent state (2 hours or longer in Examples).

The negative electrode for a solid-state battery obtained according to the embodiment of the invention can be preferably used as a negative electrode for a sulfide solid-state battery. In particular, the negative electrode for a solid-state battery obtained according to the embodiment of the invention is useful as a negative electrode for an all-solid-state lithium secondary battery.

What is claimed is:

1. A method of manufacturing a negative electrode for a solid-state battery, the method comprising:
    a first step of mixing a negative electrode active material, a sulfide solid electrolyte, a copolymer as a binder, and butyl butyrate as a solvent with each other to prepare a negative electrode slurry, in which the copolymer consists of a vinylidene fluoride monomer unit and a hexafluoropropylene monomer unit, and a molar ratio of the hexafluoropropylene monomer unit to a total amount of the vinylidene fluoride monomer unit and the hexafluoropropylene monomer unit is 10% to 25%,
    wherein the first step includes:

a step of adding the binder to the solvent and then leaving the binder to stand in the solvent such that the binder is swollen, and a step of dispersing the swollen binder in the solvent;

a second step of applying the prepared negative electrode slurry to a surface of a solid electrolyte layer of the solid-state battery or a substrate of the negative electrode; and a third step of drying the applied negative electrode slurry.

2. The method according to claim 1, wherein the binder is added to the solvent and then is left to stand in the solvent until the binder is in a transparent state.

3. The method according to claim 1, wherein in the first step, a content of the binder is 0.5 parts by mass to 3.5 parts by mass with respect to 100 parts by mass of the negative electrode active material.

4. A method of manufacturing a solid-state battery, the method comprising:

a step of laminating a negative electrode for a solid-state battery which is obtained using the method according to claim 1, a solid electrolyte layer containing a solid electrolyte, and a positive electrode containing a positive electrode active material.

5. The method according to claim 1, wherein in the first step, the binder is left to stand in the solvent for 2 hours or more such that the binder is swollen.

* * * * *